(12) United States Patent
Watanabe et al.

(10) Patent No.: US 12,081,675 B2
(45) Date of Patent: Sep. 3, 2024

(54) CONTENT USE SYSTEM, PERMISSION TERMINAL, BROWSING TERMINAL, DISTRIBUTION TERMINAL, AND CONTENT USE PROGRAM

(71) Applicant: Nippon Telegraph and Telephone Corporation, Tokyo (JP)

(72) Inventors: Hiroki Watanabe, Musashino (JP); Shigenori Ohashi, Musashino (JP); Tatsuro Ishida, Musashino (JP); Shigeru Fujimura, Musashino (JP); Atsushi Nakadaira, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 357 days.

(21) Appl. No.: 17/617,838

(22) PCT Filed: Jun. 17, 2019

(86) PCT No.: PCT/JP2019/023904
§ 371 (c)(1),
(2) Date: Dec. 9, 2021

(87) PCT Pub. No.: WO2020/255207
PCT Pub. Date: Dec. 24, 2020

(65) Prior Publication Data
US 2022/0247570 A1    Aug. 4, 2022

(51) Int. Cl.
*G06F 21/00*   (2013.01)
*G06F 21/64*   (2013.01)
(Continued)

(52) U.S. Cl.
CPC ............ *H04L 9/3247* (2013.01); *G06F 21/64* (2013.01); *H04L 9/30* (2013.01); *H04L 9/50* (2022.05)

(58) Field of Classification Search
CPC . H04L 9/3247; H04L 9/30; H04L 9/50; H04L 2209/60; H04L 2209/68;
(Continued)

(56) References Cited

U.S. PATENT DOCUMENTS

2018/0343126 A1\* 11/2018 Fallah .................. H04L 9/3297
2020/0175590 A1\*  6/2020 Huo ......................... H04L 9/50
2022/0053041 A1\*  2/2022 Drako ...................... H04N 7/18

OTHER PUBLICATIONS

Banet, "IPFS-Content Addressed, Versioned, P2P File System (Draft 3)," available on or before Jul. 29, 2016, retrieved from URL <https://ipfs.io/ipfs/QmR7GSQM93Cx5eAg6a6yRzNde1FQv7uL6X1o4k7zrJa3LX/ipfs.draft3.pdf>, 11 pages.

(Continued)

*Primary Examiner* — Jeffrey C Pwu
*Assistant Examiner* — Helai Salehi
(74) *Attorney, Agent, or Firm* — Fish & Richardson P.C.

(57) ABSTRACT

A permission terminal generates access information for content using a content public key of the content and a user public key of a browser of the content, and registers the access information in a blockchain. The access information includes an aggregate public key generated by aggregating the content public key and the user public key, a message for the content, and a content signature obtained by signing the message with a content private key corresponding to the content public key. A browsing terminal acquires access information of requested content from a blockchain and verifies, with the aggregate public key, an aggregate signature where a user signature in which a message of the access information is signed with a user private key and the content signature of the access information are aggregated, and transmits a content request including the user signature or the aggregate signature if the verification succeeds.

5 Claims, 10 Drawing Sheets

(51) Int. Cl.
*H04L 9/00* (2022.01)
*H04L 9/30* (2006.01)
*H04L 9/32* (2006.01)

(58) Field of Classification Search
CPC ....... H04L 9/14; H04L 9/3252; H04L 63/123; H04L 63/126; G06F 21/64; G06F 21/6209; G06F 21/6245; G06F 21/645
See application file for complete search history.

(56) References Cited

OTHER PUBLICATIONS

Steichen et al., "Blockchain-Based, Decentralized Access Control for IPFS," IEEE Conference on Internet of Things, Green Computing and Communications, Cyber, Physical and Social Computing, Smart Data, Blockchain, Computer and Information Technology, Congress on Cybermatics, dated Jul. 2018, 9 pages.

* cited by examiner

Fig. 2A

|  | CONTENT IDENTIFIER | AGGREGATE PUBLIC KEY | MESSAGE | SIGNATURE SIGNED WITH CONTENT KEY FOR ANONYMITY |
|---|---|---|---|---|
| CONTENT 1 | $c^1$ | $p^1$ | $m^1$ | $\sigma_c^1$ |
| CONTENT 2 | $c^2$ | $p^2$ | $m^2$ | $\sigma_c^2$ |
| CONTENT 3 | $c^3$ | $p^3$ | $m^3$ | $\sigma_c^3$ |
| ⋮ | ⋮ | ⋮ | ⋮ | ⋮ |

Fig. 2B

|  | CONTENT IDENTIFIER | AGGREGATE PUBLIC KEY | MESSAGE | SIGNATURE SIGNED WITH CONTENT KEY FOR ANONYMITY |
|---|---|---|---|---|
| CONTENT 1 | $c^1$ | $p^{1,1}$ | $m^{1,1}$ | $\sigma_c^{1,1}$ |
|  |  | $p^{1,2}$ | $m^{1,2}$ | $\sigma_c^{1,2}$ |
| CONTENT 2 | $c^2$ | $p^{2,1}$ | $m^{2,1}$ | $\sigma_c^{2,1}$ |
| ⋮ | ⋮ | ⋮ | ⋮ | ⋮ |

CONTENT USE SYSTEM, PERMISSION TERMINAL, BROWSING TERMINAL, DISTRIBUTION TERMINAL, AND CONTENT USE PROGRAM

CROSS-REFERENCE TO RELATED APPLICATIONS

This application is a National Stage application under 35 U.S.C. § 371 of International Application No. PCT/JP2019/023904, having an International Filing Date of Jun. 17, 2019, the disclosure of which is considered part of the disclosure of this application, and is incorporated in its entirety into this application.

TECHNICAL FIELD

The present invention relates to a content use system, a permission terminal, a browsing terminal, a distribution terminal, and a content use program.

BACKGROUND ART

In a transaction of digital cryptocurrency, a blockchain which is a type of decentralized distributed ledger is used. In blockchain, pieces of information regarding a transaction of cryptocurrency between participants are collected in units called blocks to form a blockchain. In a blockchain structure, a block is recorded in the form of a link with an immediately previous block, as the term a chain is suggested, in a blockchain. Specifically, each block is linked by containing a hash value of an immediately previous block in a block.

Thus, to falsify information regarding a transaction included in a block at a certain time point, it is necessary to falsify all blocks at or after the block because a hash value of the block is changed. When a block is added, a process (mining) is necessary to find additional information (nonce) indicating that a hash value of the block matches specific conditions by the addition of the block. A calculation amount of the process is considerably large and the blockchain is formed with a structure that is extremely resistant to falsification.

In Ethereum, a programmable blockchain has been suggested. A program code called a contract is registered in advance in a blockchain. After a transaction designating the execution of the contract is input, the program code is executed upon inclusion of the transaction in the block. An execution result is stored in state data of the blockchain.

On the other hand, there is an interplanetary file system (IPFS) as a distributed file management system in which no privileged node is assumed (see NPL 1). In the IPFS, a file is split into blocks with a specific size and is managed by a terminal belonging to the IPFS. A file is recognized with an identifier generated from a hash value. Thus, the file may not be falsified. The IPFS can ensure transparency and reliability by a distributive property and an ID structure.

Focusing on a structure that is extremely resistant against falsification of the blockchain, there is a system in which a distributed file management system and a blockchain are merged (see NPL 2). In NPL 2, a file is split into chunks. The individual chunks are collected in a directed acyclic graph (DAG) and information regarding the chunks of link destinations is written into the chunks. In NPL 2, identifiers of all the chunks that form a DAG are registered in the blockchain individually.

CITATION LIST

Non Patent Literature

[NPL 1] Juan Banet, "IPFS-Content Addressed, Versioned, P2P File System (DRAFT 3)", <https://ipfs.io/ipfs/QmR7GSQM93Cx5eAg6a6yRzNde1FQv7uL6X1o4k7zrJa3LX/ipfs.draft3.pdf>
[NPL 2] Mathis Steichen et al., "Blockchain-Based, Decentralized Access Control for IPFS": <https://www.researchgate.net/publication/327034734_Blockchain-Based_Decentralized_Access_Control_for_IPFS>

SUMMARY OF THE INVENTION

Technical Problem

In NPL 2, a list of users who can access files managed in an IPFS is retained in a smart contract on a blockchain. In the list, the users are designated with identifiers on Ethereum, that is, Ethereum addresses. An address is calculated from a public key generated by a user by means of elliptic-curve cryptography and is uniquely linked to a private key managed by users with terminals.

In NPL 2, the list is shared on the blockchain. Therefore, users can check the access right to the file by themselves. At the same time, there is concern about privacy that third parties can also recognize that the users can access the file. As a method of improving anonymity, a different address is used for each file without reuse of a fixed address (a public key). However, this method impairs usability because it is necessary to generate and manage private keys corresponding to a plurality of addresses.

The present invention has been devised in view of the foregoing problems and an objective of the present invention is to provide a technology for ensuring anonymity of access information managed on a blockchain.

Means for Solving the Problem

To achieve the foregoing objective, according to an aspect of the present invention, a content use system includes a permission terminal and a browsing terminal. The permission terminal includes a generation unit that generates access information for content using a content public key of the content and a user public key of a browser of the content, and a registration unit that registers the access information in a blockchain. The access information includes an aggregate public key in which the content public key and the user public key are aggregated, a message for the content, and a content signature in which the message is signed with a content private key corresponding to the content public key. The browsing terminal includes a checking unit that d acquires access information of requested content from the blockchain and verify, with the aggregate public key of the access information, an aggregate signature where a user signature in which a message of the access information is signed with a user private key and the content signature of the access information are aggregated, and a request unit that transmits a content request including the user signature or the aggregate signature if the verification succeeds.

According to another aspect of the present invention, a permission terminal includes a generation unit that generates access information for content using a content public key of the content and a user public key of a browser of the content, and a registration unit that registers the access information in a blockchain. The access information includes an aggregate public key in which the content public key and the user public key are aggregated, a message for the content, and a content signature in which the message is signed with a content private key corresponding to the content public key.

According to still another aspect of the present invention, a browsing terminal includes a checking unit that acquires access information of requested content from a blockchain and verify, with an aggregate public key of the access information, an aggregate signature where a user signature in which a message of the access information is signed with a user private key and a content signature of the access information are aggregated, and a request unit that transmits a content request including the user signature or the aggregate signature if the verification succeeds.

According to still another aspect of the present invention, a distribution terminal includes a checking unit that acquires access information of requested content from a blockchain and verify, with an aggregate public key of the access information, an aggregate signature where a user signature in which a message of the access information is signed with a user private key and a content signature of the access information are aggregated, a request unit that transmits a content request including the user signature to a permission terminal if the verification succeeds, and a sharing control unit that acquires access information corresponding to the content from the blockchain in response to the content request, verifies, with an aggregate public key of the access information, an aggregate signature in which a content signature of the access information and a user signature included in the content request are aggregated, and determines whether the content request is permitted.

According to still another aspect of the present invention, a distribution terminal includes a checking unit that acquires an access information of a requested content from a blockchain and verifies, with an aggregate public key of the access information, an aggregate signature where a user signature in which a message of the access information is signed with a user private key and a content signature of the access information are aggregated, a request unit that transmits a content request including the aggregate signature to a permission terminal if the verification succeeds, and a sharing control unit that acquires access information corresponding to the content from the blockchain in response to a content request, verifies, with the aggregate public key of the access information, the aggregate signature included in the content request, and determines whether the content request is permitted.

According to still another aspect of the present invention, a content use program causes a computer to function as the permission terminal.

According to still another aspect of the present invention, a content use program causes a computer to function as the browsing terminal.

According to still another aspect of the present invention, a content use program causes a computer to function as the distribution terminal.

Effects of the Invention

According to the present invention, it is possible to provide a technology for ensuring anonymity of access information managed on a blockchain.

BRIEF DESCRIPTION OF DRAWINGS

FIG. 2A is a diagram illustrating an example of access information.

FIG. 2B is a diagram illustrating another example of the access information.

FIG. 11 is a diagram illustrating a configuration of a computer.

DESCRIPTION OF EMBODIMENTS

Figure 1:
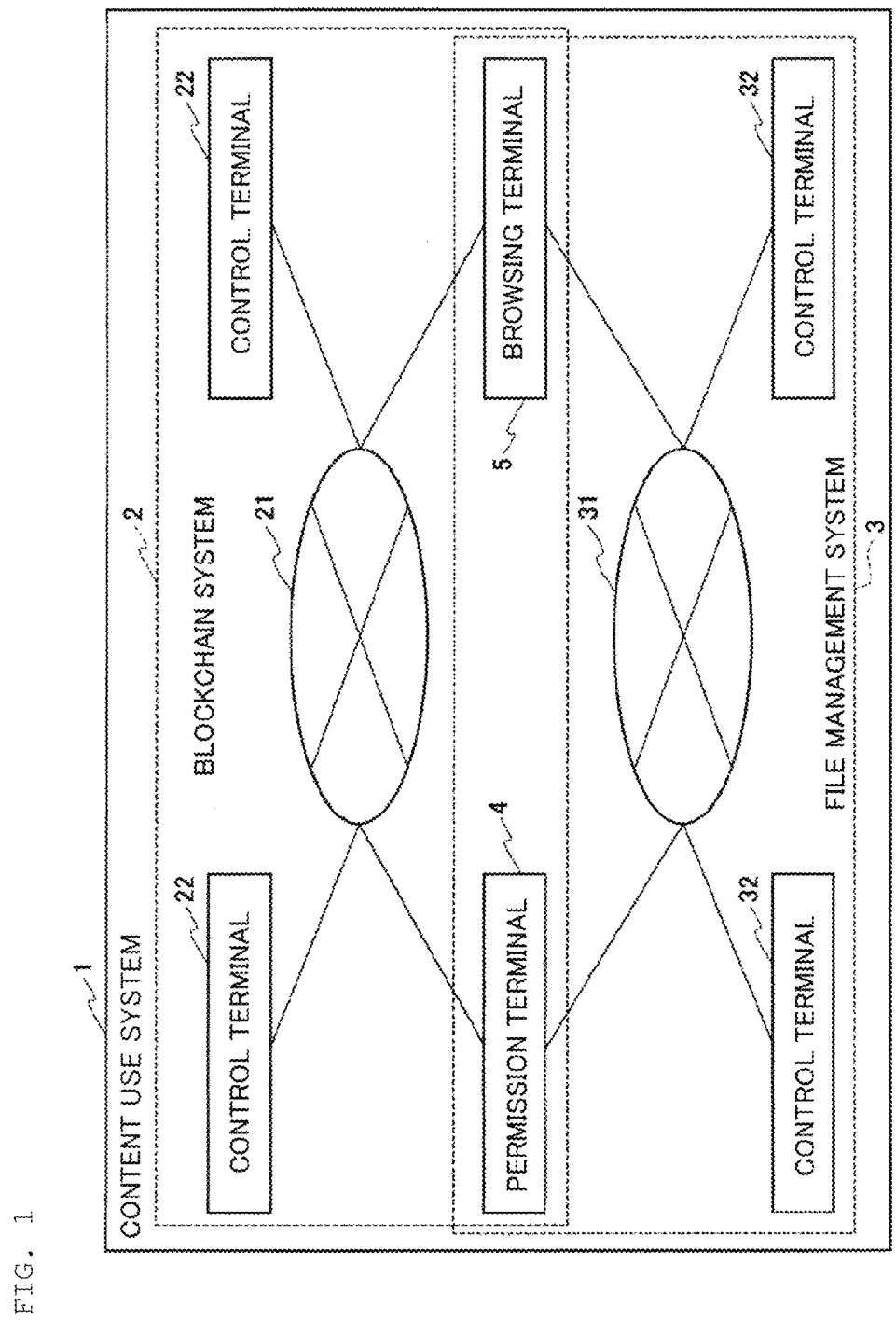
FIG. 1 is a diagram illustrating an overall configuration of a content use system according to a first embodiment.

Hereinafter, embodiments of the present invention will be described with reference to the drawings. In the description of the drawings, the same reference numerals are given to the same units and description thereof will be omitted.

Overview of Embodiment

In an embodiment, a public key for anonymity is defined separately from an address on a normal blockchain. The public key for anonymity may function as an anonymous address for identifying a user, but it is assumed that the public key for anonymity is known by only a limited number of parties concerned. For example, a permitter who gives an access right receives a public key for anonymity from users to whom the access right is given and identifies the users by means of the public key for anonymity. Meanwhile, it is assumed that the public key for anonymity will be distributed to only the parties concerned.

The public key for anonymity has the property of being able to be cryptographically aggregated. For example, if n public keys $P_1, P_2, P_3, \ldots, P_n$ are defined, the public keys are aggregated as follows.

$$P = P_1 + P_2 + P_3 + \ldots + P_n \qquad \text{[Math. 1]}$$

If signatures $\sigma_1, \sigma_2, \sigma_3, \ldots, \sigma_n$ in which private keys pared with the public keys are used are aggregated as follows, the aggregate signatures σ can be verified with aggregate public keys P.

$$\sigma = \sigma_1 + \sigma_2 + \sigma_3 + \ldots \sigma_n \qquad \text{[Math. 2]}$$

As a signature algorithm capable of aggregating the signature keys, a Schnorr signature, a Boneh, Lynn, Shacham (BLS) signature, or the like is known.

In the embodiment, anonymization of users is realized using such aggregate properties. The anonymization is performed by a permission terminal of a permitter which registers a file and generates access information (access control information). First, the permission terminal (the permitter) generates a single public key $P_c$ (hereinafter referred to as a content public key for anonymity) in which aggregating is possible with regard to a combinations of a content files and a user. Thereafter, the permission terminal aggregates the content public keys $P_c$ for anonymity and user public keys $P_u$ for anonymity received from the users to generate anonymized aggregate public keys P.

The permission terminal generates access information using the aggregate public keys P as permission destinations of the access right and registers the access information in a blockchain. At this time, the permission terminal registers, as access information, the aggregate public key P, any message m, and a signature value $\sigma_c$ of a message m signed with a content private key $s_c$ for anonymity.

One key pair of content public key $P_c$ for anonymity serving as an aggregate source and the private key $s_c$ is generated at random with regard to a combination of a file and a user. Therefore, even if the user reuses the user public key $P_u$ for anonymity, the aggregate public key P which is an aggregation result has a different value every time. Thus, even if the user uses a fixed user public key $P_u$ for anonymity, it is possible to provide a structure capable of improving anonymity in the embodiment.

First Embodiment (Overall Configuration of Content Use System)

FIG. 1 is a diagram illustrating an overall configuration of a content use system according to a first embodiment of the present invention. A content use system 1 according to the embodiment includes a blockchain system 2 (a distributed ledger system) and a file management system 3.

The blockchain system 2 includes a permission terminal 4 and a browsing terminal 5. The terminals 4 and 5 are connected autonomously and decentrally to a blockchain network 21 which is a peer to peer (P2P) network. The blockchain system 2 may include a plurality of control terminals 22 in addition to the permission terminal 4 and the browsing terminal 5.

Each of the terminals 4, 5, and 22 belonging to the blockchain system 2 includes a blockchain (a distributed ledger) to be described below and a blockchain control unit that synchronizes the blockchain. Each terminal mutually verifies data and a transaction recorded on the blockchain and maintains the system. The blockchain is shared between the terminals belonging to the system 2. The blockchain is data in which blocks including a transaction issued by the terminals belonging to the system are connected.

The blockchain according to the embodiment is a smart contract block chain. For example, Ethereum which is one of blockchain-based technologies may be used. Ethereum is an application development platform for using a blockchain as a distributed ledger on which state transition is recorded. However, the blockchain is not limited to Ethereum and another blockchain other than Ethereum may be used.

The file management system 3 includes the permission terminal 4 and the browsing terminal 5. The terminals 4 and 5 are connected to a network 31 of the file management system 3. The file management system 3 may include a plurality of control terminals 32 in addition to the permission terminal 4 and the browsing terminal 5. Each of the terminals 4, 5, and 32 belonging to the file management system 3 is P2P-connected via the network 31.

A description is given for a case where, in the embodiment, the file management system 3 is, for example, a decentralized distributed file management system such as an IPFS. The distributed file management system is a system in which each of terminals belonging to the system manages files in a distributed manner. However, the file management system 3 is not limited to a distributed file management system. For example, a storage which is managed in a centralized manner on a normal cloud may be used for the file management system 3.

The permission terminal 4 is a terminal (a node) used by a permitter who permits access (browsing) to content. The permission terminal 4 is connected to the blockchain system 2 and the file management system 3. The browsing terminal 5, which is a terminal used by a browser of content, is connected to the blockchain system 2 and the file management system 3. The numbers of permission terminals 4 and browsing terminals 5 may be more than one.

The control terminal 22 of the blockchain system 2 is a terminal used by a user other than a permitter and a browser of content among users who use the system 2. The control terminal 32 of the file management system 3 is a terminal used by a user other than a permitter and a browser of content among users who use the system 3. The number of each of control terminals 22 and 32 is two in the illustrated example, but the number is not limited to two. The control terminal 22 of the blockchain system 2 and the control terminal 32 of the file management system 3 may be different terminals, or alternatively a blockchain function and a file management function may be implemented on one terminal.

(Access Information)

Access information for content data used in the content use system 1 (access control information) is registered in the blockchain of the embodiment. The access information links an identifier of content data in the file management system 3 with a user who can perform browsing.

The access information of the embodiment will be described with reference to FIGS. 2A and 2B. The access information is information for managing an access right to content data registered in the file management system 3. The access information is generated by the permission terminal 4. The access information is publicized on the blockchain and can be browsed from other terminals connected to the network 21 of the blockchain. The access information is stored by associating an aggregate public key, a message, and a signature with an identifier of each piece of content.

The access information illustrated in FIGS. 2A and 2B includes a content identifier, an aggregate public key, a message, and a signature (a signature value) signed with a content private key for anonymity. The content identifier uniquely identifies content data. The content identifier may be, for example, a hash value of content registered in the file management system 3.

In the example illustrated in FIG. 2A, a content identifier $C^i$ is shown, where i=1, 2, 3 and this indicates that each of different pieces of content is handled. The content identifier is linked to an element set ($P^i$, $m^i$, $\sigma_c^i$) for authenticating a user. Here, P is an aggregate public key, m is any message, and $\sigma_c$ is a signature generated using a content private key for anonymity with regard to the message m.

FIG. 2B illustrates an example in which a plurality of users are linked to one content identifier. In this case, the content identifier is expressed as $C^i$. The content identifier is linked to an element set ($P^{i,j}$, $m^{i,j}$, $\sigma_c^{i,j}$) for authenticating a user. Here, i=1, 2, 3 indicates that each of different pieces of content is handled and j=1, 2 indicates that different users are handled.

Hereinafter, the access information is denoted by a content identifier C and an authentication element set (p, m, $\sigma_c$) and superscripts are omitted in description except for a case of a plurality of pieces of content and a plurality of users.

The signature aggregating will be described below. In the embodiment, a signature algorithm is used in which bilinear mapping (pairing) is used to enable signature aggregating.

$G_1$ and $G_2$ are an addition cyclic group of a prime order q and there is a multiplication cyclic group $G_T$ of the order q that satisfies the following using bilinear mapping e.

$$e: G_1 \times G_2 \rightarrow G_T \qquad \text{[Math. 3]}$$

A hash function is defined so that a destination to which an input M with any length is mapped is $G_1$.

$$H: M \rightarrow G_1 \qquad \text{[Math. 4]}$$

A private key s is selected from a finite field $F_q$ as follows.

$$s \in F_q \qquad \text{[Math. 5]}$$

When a public parameter $Q \in G_2$ is a generation source, the public key P is as follows.

$$P \leftarrow sQ \in G_2 \qquad \text{[Math. 6]}$$

At this time, a signature with respect to a hash value H(m) of the message m is as follows using the private key s.

$$\sigma \leftarrow sH(m) \in G_1 \qquad \text{[Math. 7]}$$

At this time, it is verified whether the following expression is established.

$$e(H(m), P) = e(\sigma, Q) \qquad \text{[Math. 8]}$$

In the verification, a bilinear property of pairing is used. In the bilinear property of pairing, the following relational expression is established.

$$e(aX, bY) = e(X, Y)^{ab} \qquad \text{[Math. 9]}$$

Accordingly, in the verification course, P=sQ and σ=sH(m) is obtained. Therefore, if σ is a right signature, the following expression is established.

$$e(H(m), P) = e(H(m), sQ) = e(H(m), Q)^s = e(sH(m), Q) = e(\sigma, Q) \qquad \text{[Math. 10]}$$

Here, in the signature in which pairing is used, it is confirmed that aggregate properties are established in a signature key and a public key.

For example, a public key, a private key, and a set ($P_2$, $s_2$, $\sigma_2$) different from a signature set ($P_1$, $s_1$, $\sigma_1$) are defined, and the public key P and the signature σ aggregated as follows are created.

$$\sigma = \sigma_1 + \sigma_2 = (s_1 + s_2)H(m)$$

$$P = P_1 + P_2 = (s_1 + s_2)Q \qquad \text{[Math. 11]}$$

For the aggregate signature σ and the aggregate public key P also, the signature can be verified using the following bilinear property.

$$e(H(m), P) = e(H(m), (s_1 + s_2)Q) = e(H(m), Q)^{s_1+s_2} = \qquad \text{[Math. 12]}$$
$$e((s_1 + s_2)H(m), Q) = e(\sigma, Q)$$

Here, the access information will be described again. The aggregate public key P in the access information is the aggregation of the content public key $P_c$ for anonymity and the user public key $P_u$ for anonymity. At this time, an expression related to the verification is as follows.

$$e(H(m), P) = e(H(m), P_c + P_u) = e(\sigma_c + \sigma_u, Q) \qquad \text{[Math. 13]}$$

From the above, if the signature value $\sigma_u$ for the message m is submitted by the user, the aggregate signature value can be verified using the aggregate public key P. The signature value $\sigma_u$ may not be created if the private key $s_u$ paired with the user public key $P_u$ for anonymity is not owned.

Accordingly, the user who viewed the access information can use the user public key $P_u$ for anonymity owned by the user to check on the blockchain whether the user has the access right.

(Permission Terminal)

Figure 3:
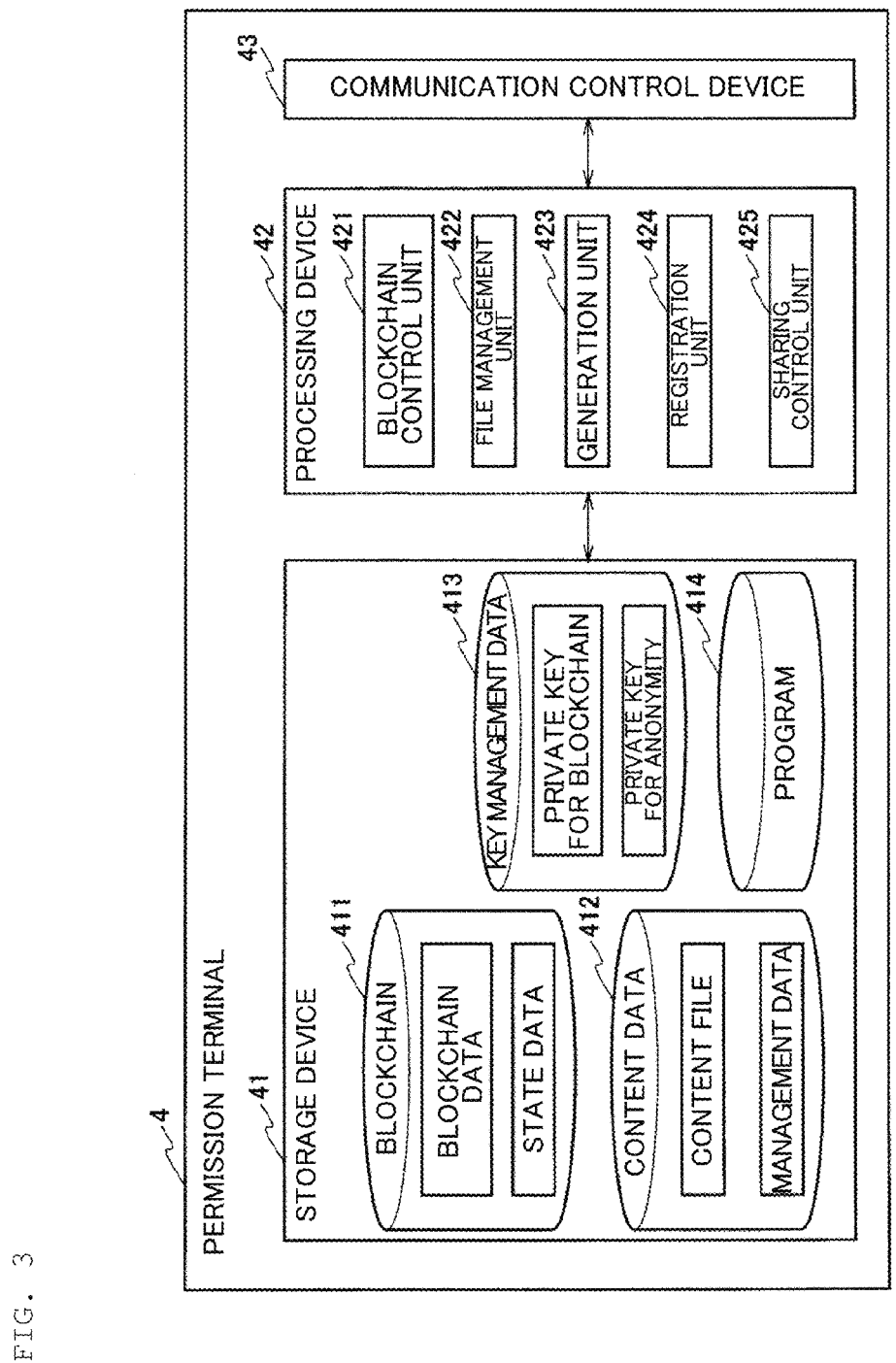
FIG. 3 is a block diagram illustrating a configuration example of a permission terminal.

The permission terminal 4 according to the embodiment will be described with reference to FIG. 3. The permission terminal 4 includes a storage device 41, a processing device 42, and a communication control device 43.

The storage device 41 stores various pieces of data such as input data, output data, and intermediate data used for the processing device 42 to perform a process. The processing device 42 reads and writes data recorded on the storage device 41, performs inputting and outputting the data to the communication control device 43, and performs a process in the permission terminal 4. The communication control device 43 is an interface through which the permission terminal 4 is connected and communicated with terminals belonging to the network 21 of the blockchain or the network 31 of the file management.

The storage device 41 stores a blockchain 411, content data 412 owned by the permission terminal 4, key management data 413, and a permission terminal program 414 used for the permission terminal 4 to perform each function.

The blockchain data 411 includes, for example, data (a blockchain) of a blockchain body and a state data in blockchain-based Ethereum. The data of the blockchain body is formed by connecting a plurality of blocks in a chain form. Each block includes a plurality of transactions. The transaction sets, for example, a smart contract and performs a function of the smart contract.

In the state data, a data region is provided for each smart contract. In accordance with the execution of the smart contract, a data region of the corresponding smart contract is updated. In the embodiment, the smart contract that manages the above-described access information and the data are registered in the storage device 41 as the state data.

The content data 412 includes a content file (also referred to as content) which is a content body and management data necessary to operate content in the file management system 3 (routing information or the like).

The key management data 413 stores private keys for signature used in the embodiment. In the embodiment, there are two types of private keys. A first key is a private key for generating a transaction of the blockchain (a blockchain private key). The private key is a private key for assigning a signature to a transaction in accordance with a protocol of the blockchain system 2. In Ethereum, a private key in which elliptic-curve cryptography is used is retained.

A second key is a private key for an anonymity (a private key for anonymity) peculiar to the embodiment. In the embodiment, private keys for generating a BLS signature are assumed to be used as the private keys, but the present invention is not limited to the BLS signature as long as the keys can be aggregated for signature. The private keys for anonymity include private key related to content (content private keys for anonymity) and private keys related to users (user private keys for anonymity).

The processing device 42 includes a blockchain control unit 421, a file management unit 422, a generation unit 423, a registration unit 424, and a sharing control unit 425.

The blockchain control unit 421 retains a system of the blockchain by autonomously and decentrally cooperating with terminals connected to the network 21. The blockchain control unit 421 accesses the blockchain 411 to read or update data of the blockchain 411.

The file management unit 422 registers any content in the file management system 3 in response to an instruction from a permitter (a user) and acquires the content identifier C. In the embodiment, the distributed file management system such as an IPFS is used, and thus the content (a content file) is first stored in the permission terminal 4 (a local terminal). The content can be shared with other terminals via the file management system 3 as necessary by means of the control by the sharing control unit 425. Accordingly, management data (routing information) or the like necessary to share a place of the content with other terminals is shared on the network 31 of the file management system 3 via the communication control device 43.

The generation unit 423 generates access information for the content using a content public key of the content and a user public key of a browser of the content. Specifically, the generation unit 423 receives, as an input, a pair of content identifier C and user public key $P_u$ for anonymity of a browser (a user) who is permitted access to the content, generates a content key pair ($P_c$, $s_c$) for anonymity, and outputs an authentication element set (p, m, $\sigma_c$). The generation unit 423 is assumed to acquire the user public key $P_u$ for anonymity in advance.

The authentication element set includes the aggregate public key P in which the content public key $P_c$ for anonymity and the user public keys $P_u$ are aggregated, the message m for content, and the content signature $\sigma_c$ in which the message m is signed with the content private key $s_c$ for anonymity corresponding to the content public key $P_u$ for anonymity. The public parameter Q necessary when generating the content key pair for anonymity is set in advance and is assumed to be shared with other users (that is, $P_c = s_c Q$).

Here, the generation unit 423 performs key aggregating ($P = P_u + P_c$) using the input user public key $P_u$ for anonymity and the generated content public key $P_c$ for anonymity. $\sigma_c$ is a signature value in which the message m is signed with the content private key $s_c$ for anonymity. That is, $\sigma_c = s_c H(m)$ is obtained.

The different message m for signature may be generated for each pair of ($P_u$, C) (that is, each combination of the user and the content). For example, data in which the content identifier C is united with the aggregate signature P may be m. In this case, since m is determined by P and C, (P, $\sigma_c$) may be output as an authentication element set without designating m intentionally. The content private key $s_c$ for anonymity generated by the generation unit 423 is stored in the storage device 41 as the key management data 413.

The registration unit 424 registers the access information generated by the generation unit 423 on the blockchain. The registration unit 424 registers the access information on the blockchain by issuing a transaction to the blockchain network 21 via the communication control device 43. In the embodiment, the registration unit 424 issues a transaction for registering the authentication element set (P, m, $\sigma_c$) or (P, $\sigma_c$) as a corresponding value in association with the content identifier C.

The sharing control unit 425 acquires the authentication element set (P, m, $\sigma_c$) (that is, the access information) corresponding to the content from the blockchain in response to a content request, verifies, with the aggregate public key P of the authentication element set, an aggregate signature $\sigma$ where the content signature $\sigma_c$ of the authentication element set and a user signature $\sigma_u$ included in the content request are aggregated, and determines whether the content request is permitted.

Specifically, if a request for sharing content registered in the own terminal by the permitter is received from another terminal, the sharing control unit 425 determines whether a requestor has an access right. If the requestor has the access right, the content is shared. For example, it is assumed here that a request for sharing the content by designating the content identifier is transmitted from the browsing terminal 5 via the file management system 3. The browsing terminal 5 attaches the signature $\sigma_u$ for anonymity of a browser corresponding the content identifier and makes the request. The sharing control unit 425 that has received the request acquires the access information from the blockchain and determines whether the browser has the access right.

The determination is performed in the following procedure. First, the sharing control unit 425 calculates an aggregate signature $\sigma = \sigma_c + \sigma_u$ with regard to the authentication element set (P, m, $\sigma_c$) corresponding to the content identifier. Subsequently, the sharing control unit 425 verifies the aggregate signature $\sigma$ with the aggregate public key P. That is, the sharing control unit 425 verifies the signature $\sigma_u$ of the browser depending on whether $e(H(m), P) = e(\sigma, Q)$ is established. If the above expression is established, the sharing control unit 425 shares the content corresponding to the content identifier.

(Browsing Terminal)

Figure 4:
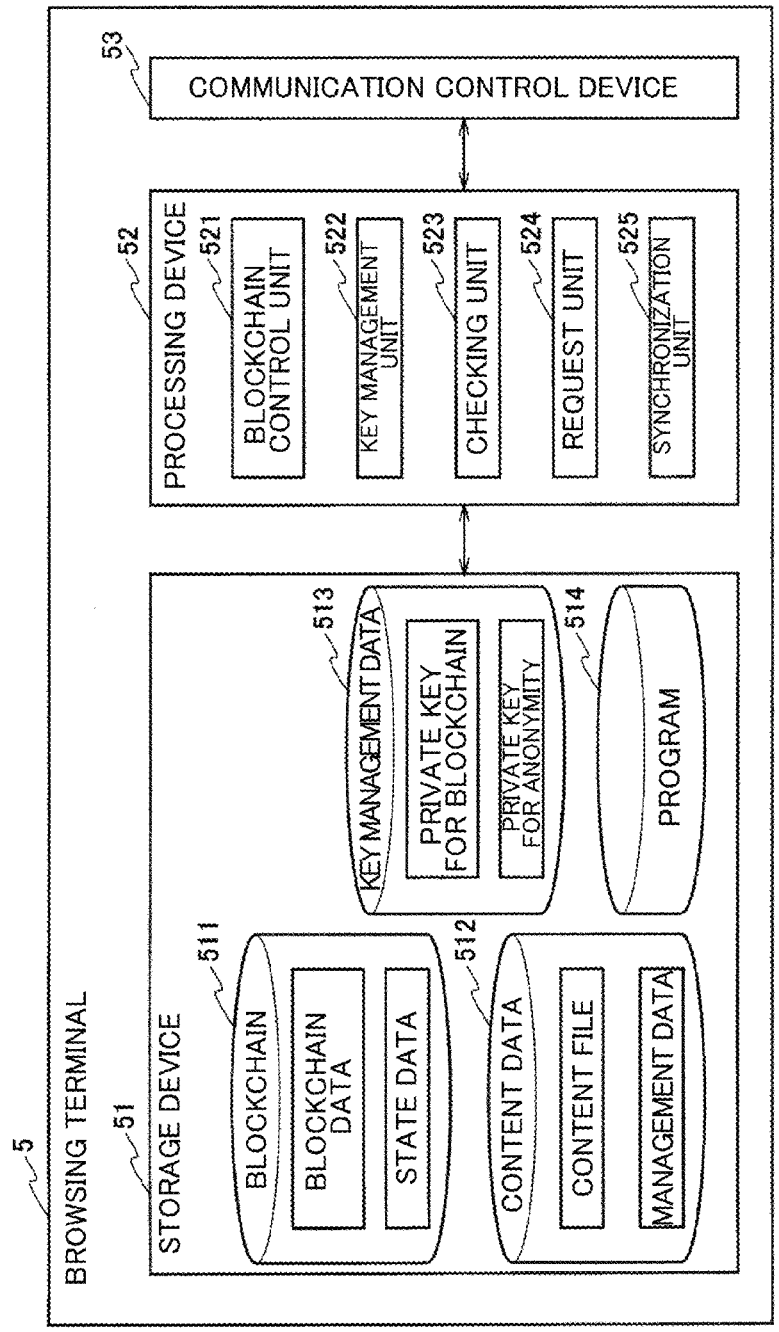
FIG. 4 is a block diagram illustrating a configuration example of a browsing terminal.

The browsing terminal 5 according to the embodiment will be described with reference to FIG. 4. The browsing terminal 5 includes a storage device 51, a processing device 52, and a communication control device 53.

The storage device 51 stores various pieces of data such as input data, output data, and intermediate data used for the processing device 52 to perform a process. The processing device 52 reads and writes data recorded on the storage device 51, performs s inputting and outputting the data to the communication control device 53, and performs a process in the browsing terminal 5. The communication control device 53 is an interface through which the browsing terminal 5 is connected and communicated with terminals belonging to the network 21 of the blockchain system 2 or the network 31 of the file management system.

The storage device 51 stores a blockchain 511, content data 512, key management data 513, and a browsing terminal program 514 used to perform each function of the browsing terminal 5. Since the blockchain 511 is the same as the blockchain 411 of the permission device 4, description thereof will be omitted here.

The content data 512 includes a content file which is a body of content owned by the browsing terminal 5 and management data necessary to operate content in the file management system 3 (routing information or the like).

The key management data 513 stores private keys for signature used in the embodiment. A first key is a private key for generating a transaction of the blockchain (a blockchain private key). A second key is a private key for anonymity. The private key for anonymity includes a private key related to a user (a user private key for anonymity).

The processing device 52 includes a blockchain control unit 521, a key management unit 522, a checking unit 523, a request unit 524, and a synchronization unit 525. Since the blockchain control unit 521 is the same as the blockchain control unit 421 of the permission device 4, description thereof will be omitted.

The key management unit 522 generates a user key pair ($P_u$, $s_u$) for anonymity based on an instruction from a browser (a user). $P_u = s_u Q$ is established with the public parameter Q shared with the permission terminal 4. The generated private key $s_u$ is stored in the storage device 51 as key management data 513.

The checking unit 523 checks whether an access right is set on the blockchain with regard to the content identified with the content identifier C. Specifically, the checking unit 523 acquires the access information (the authentication element set (P, m, $\sigma_c$)) of the requested content from the blockchain and verifies, with the aggregate public key P of the access information, the aggregate signature σ where the user signature $\sigma_u$ in which the message m of the access information is signed with the user private key $s_u$ and the content signature $\sigma_c$ of the access information are aggregated.

Here, it is assumed that the browsing terminal 5 shares the user public key $P_u$ for anonymity with the permission terminal 4 in advance and the access right related to the user public key $P_u$ for anonymity with regard to the content identifier C is set on the blockchain by the permission terminal 4. In this case, the checking unit 523 acquires the authentication element set (P, m, $\sigma_c$) by inquiring of the smart contract on the blockchain using the content identifier C as a query. The authentication element set may not explicitly include m and a value calculated uniquely by combining P and C may be set to m.

The checking unit 523 generates the signature $\sigma_u$ of the browser with regard to the message m. The signature $\sigma_u$ of the browser is $\sigma_u = s_u H(m)$. The checking unit 523 calculates the aggregate signature $\sigma = \sigma_c + \sigma_u$. Then, the checking unit 523 verifies the signature $\sigma_u$ of the browser depending on whether $e(H(m), P) = e(\sigma, Q)$ is established using the aggregate public key P and the calculated aggregate signature σ. If the above expression is established, the checking unit 523 outputs information on the success of the signature verification and the signature $\sigma_u$ of the browser used for the verification.

If the verification succeeds, the request unit 524 transmits a content request including the user signature $\sigma_u$. Specifically, the request unit 524 requests the file management system 3 to acquire any content based on an instruction from the browser (the user). In the request, the content identifier C and the user signature $\sigma_u$ of the browser are necessary. The request unit 524 checks the access right of the content using the checking unit 523 and acquires the signature $\sigma_u$ of the browser. Then, the request unit 524 transmits a content request including the content identifier C and the signature $\sigma_u$ of the browser to the file management system 3. The file management system 3 accesses the permission terminal 4 that owns an entity file using the content identifier C as a key and transmits the content request including the content identifier C and the signature $\sigma_u$ of the browser to the sharing control unit 425 of the permission terminal 4.

If the permission terminal 4 permits to share the content in response to the content request, the synchronization unit 525 synchronizes the content file with the browsing terminal 5 via the file management system 3. The synchronized content file is stored in the storage device 51.

(Operation of Content Use System)

Next, an operation of the content use system according to the embodiment will be described.

Figure 5:
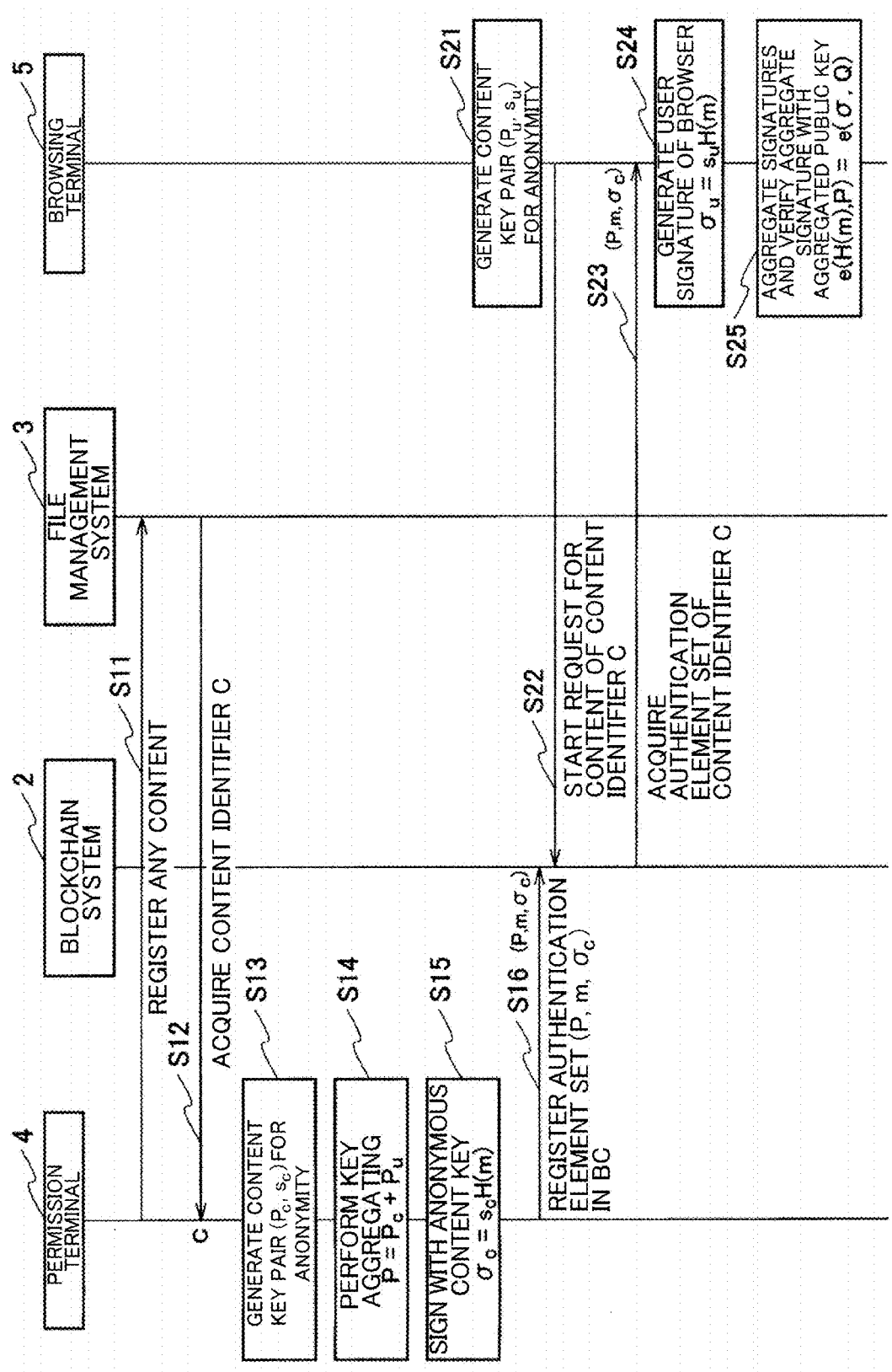
FIG. 5 is a sequence diagram illustrating an operation of the first embodiment.
Figure 6:
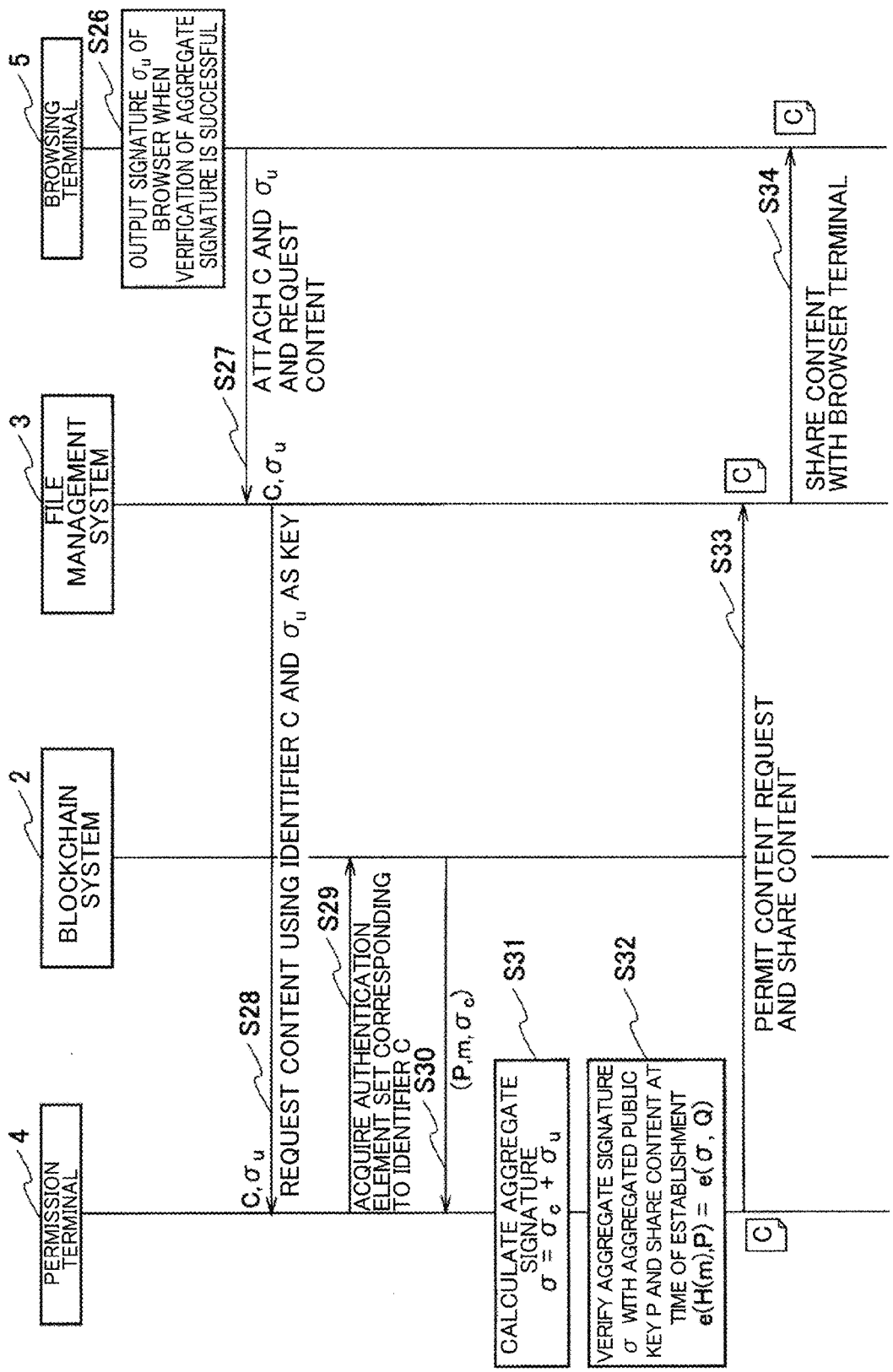
FIG. 6 is a sequence diagram illustrating an operation of the first embodiment.

FIGS. 5 and 6 are sequence diagrams illustrating an operation of the content use system. S11 to S16 are processes of registering the corresponding authentication element set (P, m, $\sigma_c$) on the blockchain when the permission terminal 4 registers content. S21 to S28 are processes of causing the browsing terminal 5 to acquire (P, m, $\sigma_c$) registered on the blockchain and to attach the signature $\sigma_u$ of the browser and request sharing of a content file. S29 to S34 are processes of causing the permission terminal 4 that has received the request to verify the aggregate signature and transmit the content file. Hereinafter, specific description will be made with reference to FIGS. 5 and 6.

The permission terminal 4 registers any content in the file management system 3 based on an instruction from the permitter (S11). If the file management system 3 is a distributed file management system such as an IPFS, information registered in the file management system 3 in S11 is routing information indicating a network address of a terminal, a location of content, or the like. A content body (a content file) is maintained in the terminal 4 of the permitter. If the file management system 3 is a centralized cloud server or the like, the content body is registered in the file management system 3 in S11.

The permission terminal 4 acquires the content identifier C with regard to the content from the file management system 3 (S12). The permission terminal 4 (the generation unit 423) generates the access information. Specifically, the permission terminal 4 accepts, as an input, the pair of content identifier C and user public key $P_u$ for anonymity of the browser (the user) who is permitted the access to the content and generates the content key pair ($P_c$, $s_c$) for anonymity (S13).

Then, the permission terminal 4 performs key aggregating ($P = P_u + P_c$) using the user public key $P_u$ for anonymity and the generated content public key $P_c$ for anonymity (S14). The permission terminal 4 signs the predetermined message m using the private key $s_c$ of the content key pair ($P_c$, $s_c$) for anonymity and generates a signature value $\sigma_c = s_c H(m)$ (S15).

Then, the permission terminal 4 registers the content identifier C and the authentication element set (P, m, $\sigma_c$) on the blockchain as the access information (S16). Specifically, the permission terminal 4 generates a transaction in which the access information is registered and issues the transaction to the network 21 of the blockchain. Thus, the authentication element set (P, m, $\sigma_c$) of the content identifier C is registered in the storage device of a terminal connected to the network 21 as blockchain data.

The browsing terminal 5 generates the user key pair ($P_u$, $s_u$) for anonymity based on an instruction from the browser (S21). $P_u = s_u Q$ is established with the public parameter Q shared with the permission terminal 4.

Then, the browsing terminal 5 checks whether the access right is set on the blockchain with regard to the content in order to request the content of the content identifier C. Specifically, the browsing terminal 5 inquires of the smart contract on the blockchain 511 of the own browsing terminal 5 using the content identifier C as a query (S22) and acquires the authentication element set (P, m, $\sigma_c$) corresponding to the content identifier C (S23).

Then, the browsing terminal 5 generates a signature $\sigma_u = s_u H(m)$ of the browser with regard to the message m (S24). Further, the browsing terminal 5 calculates the aggregate signature $\sigma = \sigma_c + \sigma_u$ and verifies the signature $\sigma_u$ of the browser depending on whether $e(H(m), P) = e(\sigma, Q)$ is established using the aggregate public key P and the calculated aggregate signature σ (S25). If the above expression is established, the browsing terminal 5 outputs information on the success of the signature verification and the signature $\sigma_u$ of the browser used for the verification (S26).

Then, the browsing terminal 5 requests the content to the file management system 3 based on an instruction from the browser (S27). That is, the browsing terminal 5 transmits a content request including the content identifier C and the signature $\sigma_u$ of the browser to the file management system 3. The file management system 3 accesses the permission terminal 4 owning the content file using the content identifier C as a key and transmits a content request including the content identifier C and the signature $\sigma_u$ of the browser to the permission terminal 4 (S28).

When the permitter is requested to permit the content registered in the own terminal 5 from the browsing terminal 5, the permission terminal 4 determines whether the browsing terminal 5 has the access right. Specifically, the permission terminal 4 accesses the blockchain 511 of the own terminal and acquires the authentication element set (P, m, $\sigma_c$) corresponding to the content identifier C from the blockchain 511 (S29 and S30).

The permission terminal 4 calculates the aggregate signature $\sigma = \sigma_c + \sigma_u$ with regard to the acquired authentication element set (P, m, $\sigma_c$ (S31). Then, the permission terminal 4 verifies the aggregate signature $\sigma$ with the aggregate public key P. That is, the permission terminal 4 determines whether $e(H(m), P) = e(\sigma, Q)$ is established. If $e(H(m), P) = e(\sigma, Q)$ is established, the permission terminal 4 determines that the browser has the access right and shares the content corresponding to the content identifier C with the browsing terminal 5 (S32).

If the content is to be shared, the permission terminal 4 transmits, to the file management system 3, a response indicating permission of the content request in S28 and a content file corresponding to the content identifier C (S33). The file management system 3 transmits the content file received in S33 to the browsing terminal 5 as a requestor (S34). The browsing terminal 5 receives the content file and stores the content file in the storage device 51.

In the embodiment, as illustrated in FIG. 2B, a case in which a plurality of users are set for one content identifier will be described. If the access right is set for a plurality of users (where j=1, 2, 3, ..., n) by i=1 of the content identifier $C^i$, the permission terminal 4 and the browsing terminal 5 perform signature verification on all the authentication element set ($P^{1,j}$, $m^{1,j}$, $\sigma_c^{1,j}$) totally (S24 and S25 in FIG. 5 and S31 and S32 in FIG. 6). The same applies to a second embodiment to be described below.

In the above described embodiment, the permission terminal 4 registers, in the blockchain, the authentication element set (the access information) including the aggregate public key P in which the content public key $P_c$ and the user public key $P_u$ are aggregated, the message m, and the content signature $\sigma_c$ in which the message m is signed with the content private key $s_c$ corresponding to the content public key $P_c$.

Thus, in the embodiment, it is possible to guarantee anonymity of the access information indicating an authority (here, an access authority to the content) managed in the blockchain. Accordingly, even if the browser (a person whose authority is set) reuses a fixed user public key in a plurality of pieces of content, the aggregate public key is set in the access information registered in the blockchain. The aggregate public key is a public key in which the user public key and a content public key different for each piece of content are aggregated by a permitter (a person who sets an authority). That is, in the embodiment, the user public key is not registered in the blockchain and the user public key can be anonymized. Since the access information (the authentication element set) publicized in the blockchain is the aggregate public key P, the message m, and the content signature $\sigma_c$, a third party may not acquire the user public key $P_u$ used for anonymity.

In the embodiment, it is possible to provide a structure in which the permitter who grants an access right and a browser who has the access right can determine that the browser has the access right by using the access information publicized to the blockchain. However, in the structure, a third party other than a party concerned (a permitter or a browser) may not easily determine which user can make access.

In the embodiment, a fixed specific user public key can be used rather than a method which the user public key different for each piece of content may be used and a disposable type user public key is used. Thus, in the embodiment, since it is not necessary to generate and manage a private key of each of a plurality of user public keys, it is possible to avoid deterioration in usability.

Second Embodiment

A second embodiment of the present invention will be described below. In the embodiment, content is distributed from a terminal other than a permission terminal.
(Overall Configuration of Content Use System)

Figure 7:
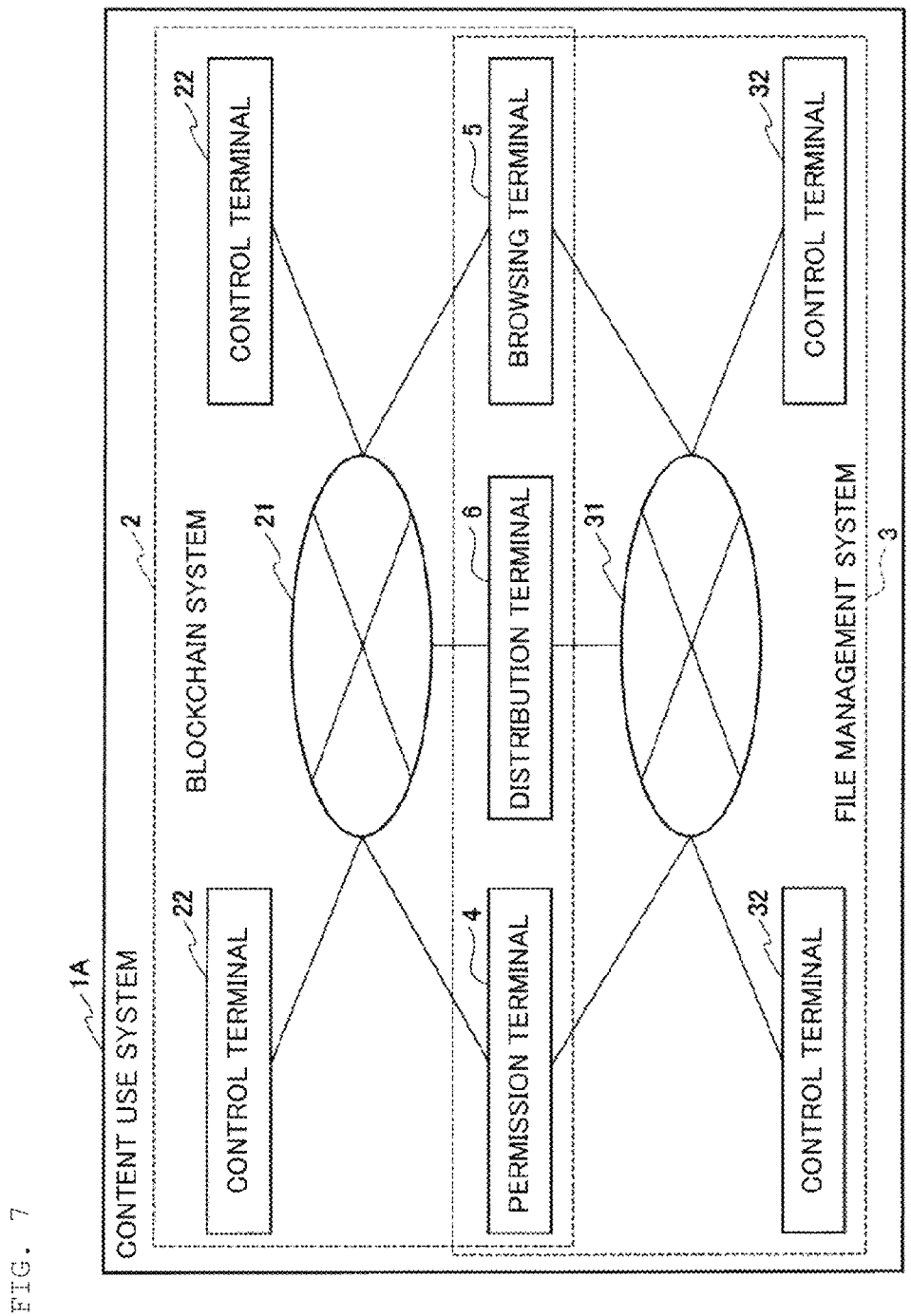
FIG. 7 is a diagram illustrating an overall configuration of a content use system according to a second embodiment.

FIG. 7 is a diagram illustrating an overall configuration of a content use system according to a second embodiment. A content use system 1A illustrated in FIG. 7 is different from the content use system 1 of the first embodiment illustrated in FIG. 1 in that a distribution terminal 6 is included, and the others are the same as those of the content use system 1 of the first embodiment.

In the embodiment, a content file which is an entity of content is distributed not only from the permission terminal 4 but also from the distribution terminal 6. The distribution terminal 6 has no authority to permit a browser to share content, but has an authority to retain the entity of the content and share the content with the browsing terminal 5 in accordance with access information registered on a blockchain.

The distribution terminal 6 has a role of requesting the content from the permission terminal 4 and redistributing the acquired content to the browsing terminal 5. Thus, it is possible to distribute the content slowly in a distributed manner without centralized management of the content by the permission terminal 4. The content is redistributed to only limited users in accordance with the access information. The distribution terminal 6 will be described below.
(Distribution Terminal)

Figure 8:
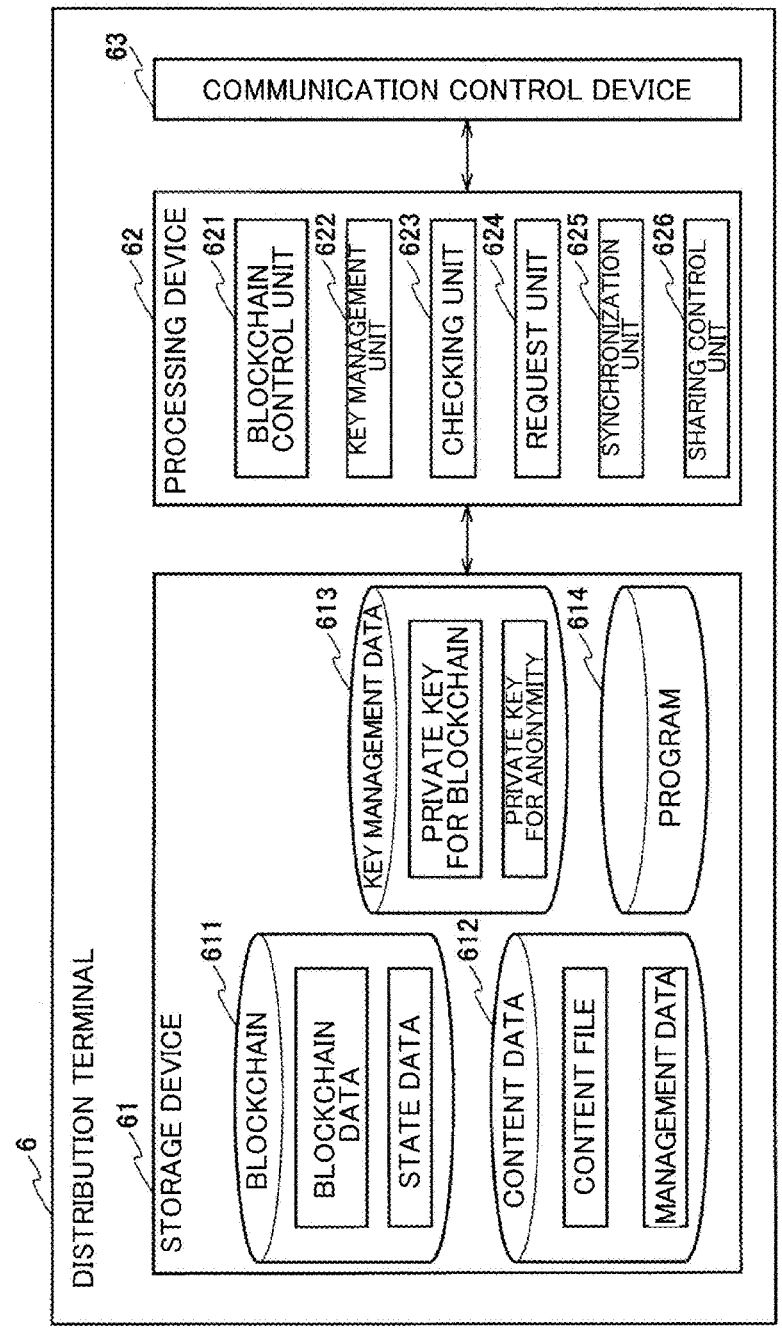
FIG. 8 is a block diagram illustrating a configuration example of a distribution terminal.

The distribution terminal 6 according to the embodiment will be described with reference to FIG. 8. The distribution terminal 6 includes a storage device 61, a processing device 62, and a communication control device 63.

The storage device 61 stores various pieces of data such as input data, output data, and intermediate data used for the processing device 62 to perform a process. The processing device 62 reads and writes data recorded on the storage device 61, performs inputting and outputting of the data to the communication control device 63, and performs a process in the distribution terminal 6. The communication control device 63 is an interface through which the distribution terminal 6 is connected and communicated with terminals belonging to the network 21 of the blockchain or the network 31 of the file management.

The storage device 61 stores a blockchain 611, content data 612, key management data 613, and a distribution terminal program 614 used to perform each function of the distribution terminal 6. Since the blockchain 611 is the same as the blockchain 411 of the permission device 4, description thereof will be omitted here.

The content data 612 includes a content file which is a body of content owned by the distribution terminal 6 and management data necessary to operate content in the file management system 3 (routing information or the like).

The key management data 613 stores private keys for signature used in the embodiment. A first key is a private key for generating a transaction of the blockchain (a blockchain private key). A second key is a private key for anonymity. The private key for anonymity includes a user private key for anonymity of a distributor.

The processing device 62 includes a blockchain control unit 621, a key management unit 622, a checking unit 623, a request unit 624, a synchronization unit 625, and a sharing control unit 626. Since the blockchain control unit 621 is the same as the blockchain control unit 421 of the permission device 4 illustrated in FIG. 3, description thereof will be omitted here.

The key management unit 522 generates a user key pair $(P_d, s_d)$ for anonymity based on an instruction from a distributor (a user). $P_d=s_dQ$ is established with the public parameter Q shared with the permission terminal 4. The generated private key $s_d$ is stored in the storage device 61 as key management data 613.

The permission terminal 4 acquires a user public key $P_d$ for anonymity of the distributor and a user public key $P_u$ for anonymity of a browser in advance (a method and a route in which the permission terminal 4 acquires the public keys do not matter). If the permission terminal 4 sets an access right of the content of the content identifier C for the distributor and the browser, different authentication element sets $(P, m, \sigma_c)$ are generated. Here, $E_d$ denotes the authentication element set of the distributor and $E_u$ denotes the authentication element set of the browser. In the embodiment, the authentication element sets $E_d$ and $E_u$ are registered in the blockchain.

The checking unit 623 checks whether an access right is set on the blockchain with regard to the content identified with the content identifier C. Specifically, the checking unit 623 acquires the access information (the authentication element set $(P, m, \sigma_c)$) of the requested content from the blockchain and verifies, with the aggregate public key P of the access information, the aggregate signature σ where the user signature in which the message m of the access information is signed with the user private key and the content signature $\sigma_c$ of the access information are aggregated.

Here, it is assumed that the distribution terminal 6 shares the user public key $P_d$ for anonymity with the permission terminal 4 in advance and the access right related to the user public key $P_d$ for anonymity with regard to the content identifier C is set on the blockchain by the permission terminal 4. In this case, the checking unit 623 acquires all the authentication element sets $(P, m, \sigma_c)$ by inquiring of the smart contract on the blockchain using the content identifier C as a query. The authentication element set may not explicitly include m and a value calculated uniquely by combining P and C may be set as m. In the embodiment, the authentication element sets $E_d$ and $E_u$ of the distribution terminal 6 and the browsing terminal 5 are acquired, but authentication elements sets of other users may be included.

The checking unit 623 repeats the following process on all the authentication element sets including $E_d$ and $E_u$. If the following expression is established in any of the authentication element sets, the checking unit 623 determines that the signature verification succeeds. For example, for the authentication element set $E_d$, the checking unit 623 generates the signature $\sigma_d$ of the distributor with regard to the message m. The signature $\sigma_d$ of the browser is $\sigma_d=s_dH(m)$.

The checking unit 623 calculates the aggregate signature $\sigma=\sigma_c+\sigma_d$. Then, the checking unit 623 verifies the signature $\sigma_d$ of the distributor depending on whether $e(H(m), P)=e(\sigma, Q)$ is established using the aggregate public key P and the calculated aggregate signature σ. If the above expression is established, the checking unit 623 outputs information on the success of the signature verification and the signature $\sigma_d$ of the distributor used for the verification. If the signature verification of the authentication element set $E_d$ succeeds, the checking unit 623 does not perform the signature verification of the other authentication element set $E_u$. Alternatively, if the signature verification of the authentication element set $E_d$ fails, the same process is repeated on the other authentication element set $E_u$.

If the verification succeeds, the request unit 624 transmits a content request including the user signature $\sigma_d$ of the distributor. Specifically, the request unit 624 requests any content from the file management system 3 based on an instruction from the distributor. For the request, the content identifier C and the signature $\sigma_d$ of the distributor are necessary. The request unit 624 checks the access right of the content using the checking unit 623 and acquires the signature $\sigma_d$ of the distributor. Then, the request unit 624 transmits a content request including the content identifier C and the signature $\sigma_d$ of the distributor to the file management system 3.

The file management system 3 accesses the permission terminal 4 that owns content using the content identifier C as a key and transmits the content request including the content identifier C and the signature $\sigma_d$ of the distributor to the sharing control unit 425 of the permission terminal 4. The request unit 624 may add index information indicating for which of authentication element sets the signature $\sigma_d$, is in addition to the content identifier C and the signature $\sigma_d$ at the time of the request.

If the permission terminal 4 permits to share the content in response to the content request, the synchronization unit 625 synchronizes the content file with the distribution terminal 6 via the file management system 3. The synchronized content file is stored in the storage device 61.

After the sharing control unit 626 receives a request of sharing content registered in the own terminal by the distributor from another terminal, the sharing control unit 626 determines whether a requestor has an access right, and if the requestor has the access right, shares the content. Specifically, the sharing control unit 626 acquires, from the blockchain, the authentication element set $E_u$ $(P, m, \sigma_c)$ (that is, the access information) of the browsing terminal 5 corresponding to the content in response to the content request, verifies, with the aggregate public key P of the authentication element set, the aggregate signature σ in which the content signature $\sigma_c$ of the authentication element set and the user signature $\sigma_u$ included in the content request are aggregated, and determines whether the content request is permitted.

For example, here, it is assumed that the content identifier is designated and the content is requested from the browsing terminal 5 via the file management system 3. The browsing terminal 5 attaches the signature $\sigma_u$ for anonymity of the browser corresponding to the content identifier and requests the content. The sharing control unit 626 that has received the request acquires the access information from the blockchain and determines whether the browser has the access right.

In the determination, the sharing control unit 626 repeats the following signature verification on all the authentication element sets $(P, m, \sigma_c)$ corresponding to the content identifiers, and if the signature verification succeeds with regard to any of authentication element sets, the sharing control unit 626 determines that the browser has the access right. First, the sharing control unit 626 calculates the aggregate signature $\sigma = \sigma_c + \sigma_u$ with regard to the authentication element sets (P, m, $\sigma_c$) corresponding to the content identifiers. Subsequently, the sharing control unit 425 verifies the aggregate signature $\sigma$ with the aggregate public key P. That is, the sharing control unit 626 verifies the signature $\sigma_u$ of the browser depending on whether $e(H(m), P) = e(\sigma, Q)$ is established. If the above expression is established, the sharing control unit 626 shares the content corresponding to the content identifier.

(Operation of Content Use System)

Next, an operation of the content use system of the embodiment will be described.

Figure 9:
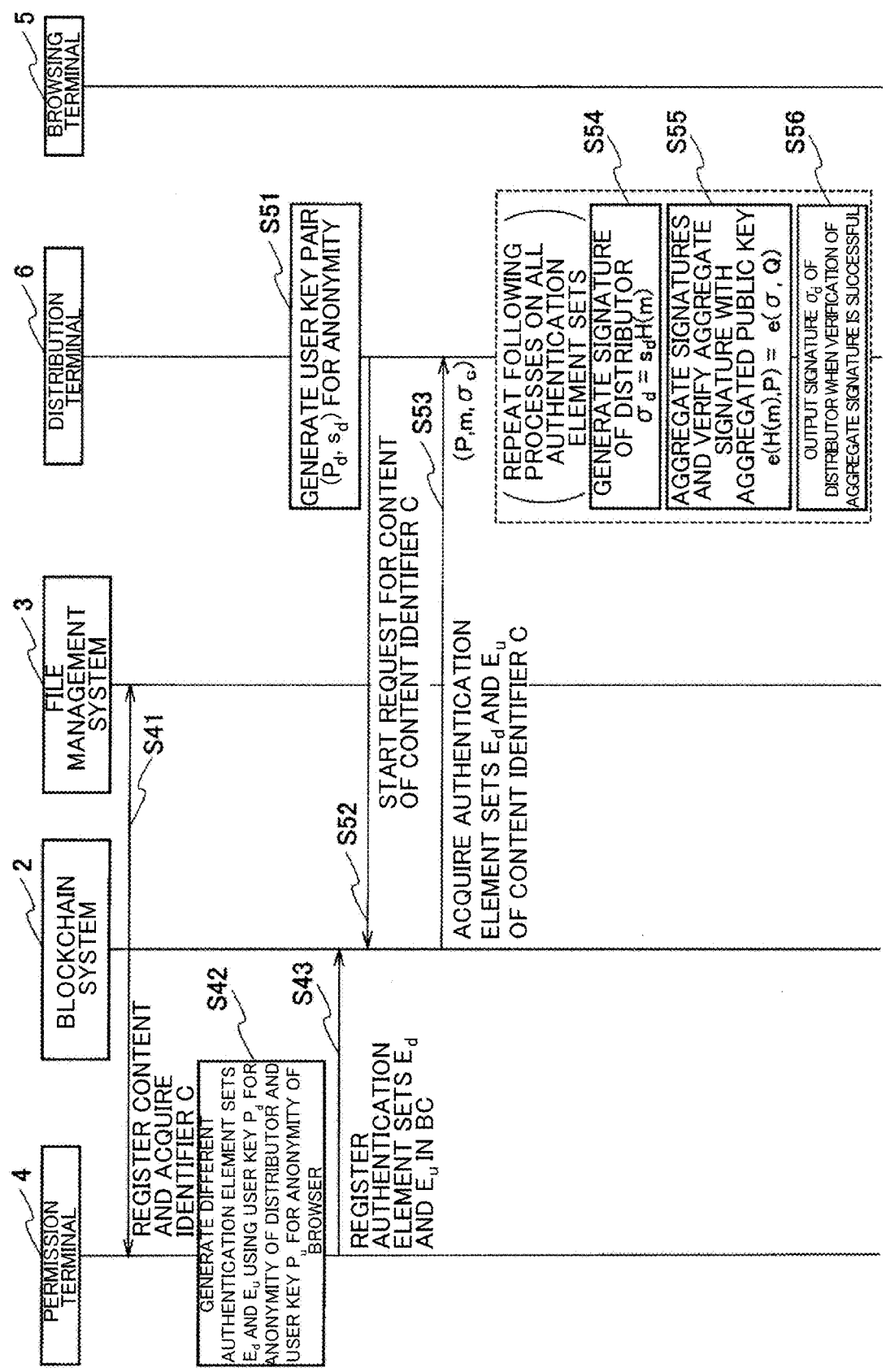
FIG. 9 is a sequence diagram illustrating an operation of the second embodiment.
Figure 10:
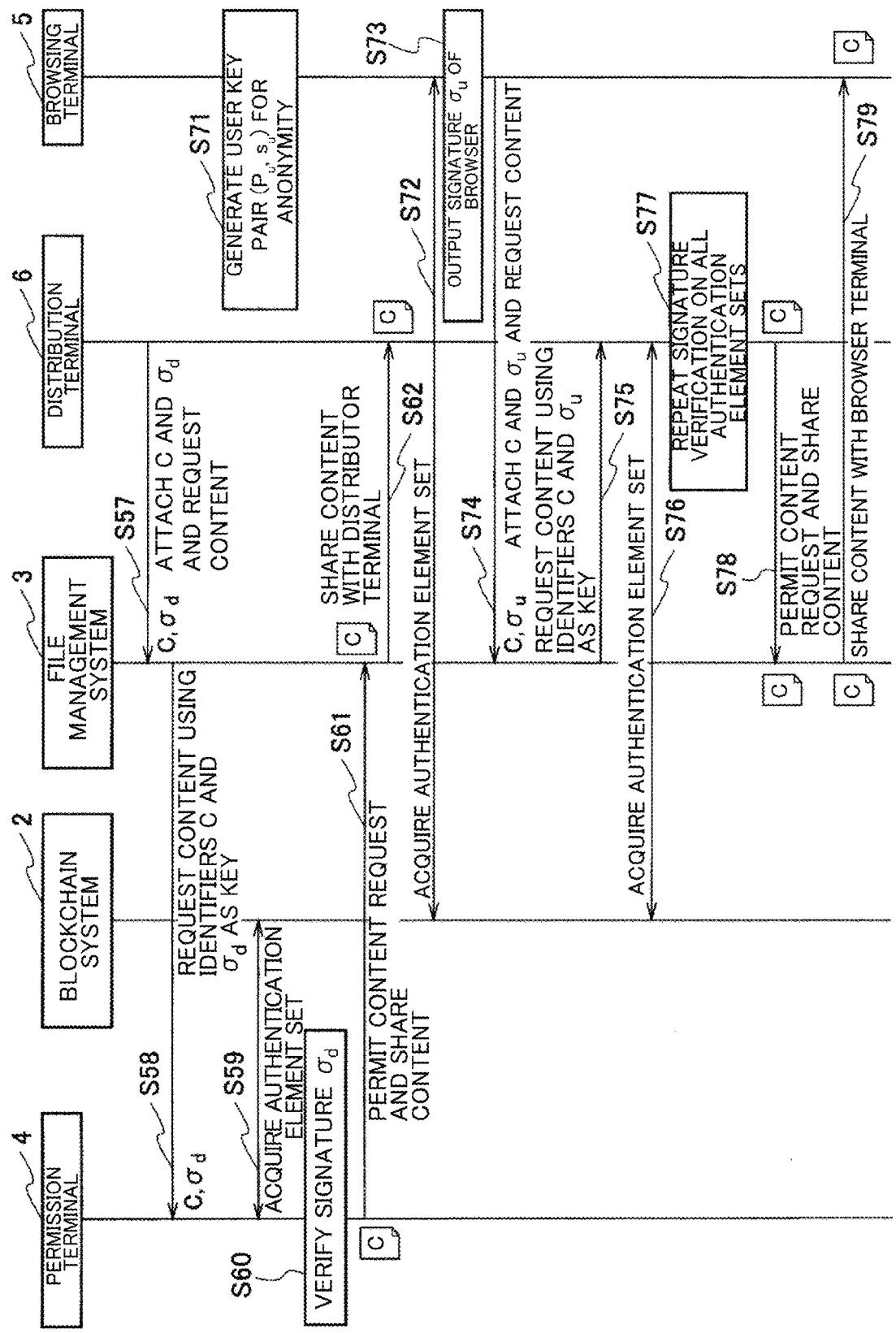
FIG. 10 is a sequence diagram illustrating an operation of the second embodiment.

FIGS. 9 and 10 are sequence diagrams illustrating an operation of the content use system. Here, differences from those of the first embodiment will be mainly described and the same processes as those of the first embodiment will be described in brief.

The permission terminal 4 registers any content in the file management system 3 based on an instruction from the permitter and acquires the content identifier C of the content from the file management system 3 (S41).

The permission terminal 4 generates the access information (S42). It is assumed that the permission terminal 4 acquires the user public key $P_d$ for anonymity of the distributor and the user public key $P_u$ for anonymity of the browser in advance. The permission terminal 4 generates the authentication element set $E_d$ (P, m, $\sigma_c$) for the distributor corresponding to the content with the content identifier C using the user public key $P_d$ for anonymity of the distributor. The permission terminal 4 generates the authentication element set $E_u$ (P, m, $\sigma_c$) for the browser corresponding to the content with the content identifier C using the user public key $P_u$ for anonymity of the browser. The generation of the authentication element set is similar to that in the first embodiment.

The permission terminal 4 registers the access information (the authentication element sets $E_d$ and $E_u$ of the content identifier C) on the blockchain (S43).

The distribution terminal 6 generates the user key pair ($P_d$, $s_d$) for anonymity based on an instruction from the distributor (S51). $P_d = s_d Q$ is established with the public parameter Q shared with the permission terminal 4. The generated private key $s_d$ is stored in the storage device 61.

Then, the distribution terminal 6 checks whether the access right is set on the blockchain with regard to the content of the content identifier C in order to request the content. Specifically, the distribution terminal 6 inquires of the smart contract on the blockchain 611 of the own distribution terminal 6 using the content identifier C as a query (S52) and acquires the authentication element sets $E_d$ and $E_u$ corresponding to the content identifier C (S53).

Then, the distribution terminal 6 performs processes of S54 to S56 on each authentication element set E (here, the authentication element sets $E_d$ and $E_u$). For example, in the case of the authentication element set $E_d$, the distribution terminal 6 generates a signature $\sigma_d = s_d H(m)$ of the browser with regard to the message m (S54). Further, the browsing terminal 5 calculates the aggregate signature $\sigma = \sigma_c + \sigma_d$ and verifies the signature $\sigma_d$ of the distributor depending on whether $e(H(m), P) = e(\sigma, Q)$ is established using the aggregate public key P and the calculated aggregate signature $\sigma$ (S55). If the above expression is established, the distribution terminal 6 outputs information on the success of the signature verification and the signature $\sigma_d$ of the distributor used for the verification (S56).

If the signature verification of one authentication element set E succeeds, the distribution terminal 6 does not perform signature verification of the remaining authentication element sets E. That is, the distribution terminal 6 repeats the signature verification (S54 to S56) of each of the acquired authentication element sets E until the signature verification succeeds.

Then, the distribution terminal 6 transmits a content request including the content identifier C and the signature $\sigma_d$ of the distributor to the file management system 3 based on an instruction from the distributor (S57). The file management system 3 accesses the permission terminal 4 that owns the content file using the content identifier C as a key and transmits a content request including the content identifier C and the signature $\sigma_d$ of the distributor to the permission terminal 4 (S58).

The permission terminal 4 determines whether the distribution terminal 6 has the access right to the content of the own terminal 4 in response to the request from the distribution terminal 6. Specifically, the permission terminal 4 acquires all the authentication element sets E (P, m, $\sigma_c$) corresponding to the content identifier C from the blockchain 411 (S59).

The permission terminal 4 verifies the signature $\sigma_d$ of the distributor using the acquired authentication element set E (S60). For example, in the case of the authentication element sets $E_d$ (P, m, $\sigma_c$), the permission terminal 4 calculates the aggregate signature $\sigma = \sigma_c + \sigma_d$ and verifies the aggregate signature $\sigma$ with the aggregate public key P. That is, the permission terminal 4 determines whether $e(H(m), P) = e(\sigma, Q)$ is established. If $e(H(m), P) = e(\sigma, Q)$ is established, the permission terminal 4 determines that the distribution terminal 6 has the access right to the content with the content identifier C and shares the content with the distribution terminal 6. The permission terminal 4 performs the signature verification of each of the acquired authentication element sets E until the signature verification succeeds.

If the terminal has the access right, the permission terminal 4 transmits, to the file management system 3, a response indicating permission of the content request in S58 and the content file corresponding to the content identifier C (S61). The file management system 3 transmits the received content file to the distribution terminal 6 which is the requestor (S62). The distribution terminal 6 receives the content file and stores the content file in the storage device 61.

The browsing terminal 5 generates the user key pair ($P_u$, $s_u$) for anonymity based on an instruction from the browser (S71). $P_u = s_u Q$ is established with the public parameter Q shared with the permission terminal 4. Then, the browsing terminal 5 checks whether the access right is set on the blockchain with regard to the content identified with the content identifier C. Specifically, the browsing terminal 5 inquires of the smart contract on the blockchain 511 of the own browsing terminal 5 using the content identifier C as a query and acquires all the authentication element sets E (P, m, $\sigma_c$) corresponding to the content identifier C (S72).

Then, the browsing terminal 5 verifies the signature $\sigma_u$ of the browser using each of the acquired authentication element sets E (S73). For example, in the case of the authentication element set $E_u$ (P, m, $\sigma_c$), the browsing terminal 5 generates the signature $\sigma_u = s_u H(m)$ of the browser with regard to the message m and calculates the aggregate signature $\sigma = \sigma_c + \sigma_u$. Then, browsing terminal 5 verifies the signature $\sigma_u$ of the browser depending on whether $e(H(m),$ $P) = e(\sigma, Q)$ is established using the aggregate public key P and the aggregate signature $\sigma$. If the above expression is established, the browsing terminal 5 outputs information on the success of the signature verification and the signature $\sigma_u$ of the browser used for the verification. The browsing terminal 5 performs the signature verification of each of the acquired authentication element sets E until the signature verification succeeds.

Then, the browsing terminal 5 transmits a content request including the content identifier C and the signature $\sigma_u$ of the browser to the file management system 3 based on an instruction from the browser (S74). The file management system 3 transmits a content request including the content identifier C and the signature $\sigma_u$ of the browser to the distribution terminal 6 owning the content file using the content identifier C as a key (S75).

The distribution terminal 6 determines whether the browsing terminal 5 has the access right to the content retained in the own terminal 6 in response to the request from the browsing terminal 5. Specifically, the distribution terminal 6 accesses the blockchain 611 of the own terminal 6 and acquires all the authentication element sets $E_d$ and $E_u$ corresponding to the content identifier C from the blockchain 611 (S76).

The distribution terminal 6 verifies the signature $\sigma_u$ of the browser using all the acquired authentication element sets $E_d$ and $E_u$ (S77). The verification of the signature $\sigma_u$ is similar to that in S60. If the verification of the signature $\sigma_u$ using either the acquired authentication element set $E_d$ or $E_u$ succeeds, the distribution terminal 6 determines that the browsing terminal 5 has the access right of the content and shares the content with the browsing terminal 5.

If the terminal has the access right, the distribution terminal 6 transmits, to the file management system 3, a response indicating permission to the content request in S75 and the content file corresponding to the content identifier C(S78). The file management system 3 transmits the content file to the browsing terminal 5 of the requestor (S79). The browsing terminal 5 receives the content file and stores the content file in the storage device 51.

When the content is requested, the distribution terminal 6 according to the embodiment described above does not need to store the content key $P_c$ for anonymity and can determine whether the requestor has the access right using the user signature $\sigma_u$ transmitted by the browsing terminal 5 of the requestor and the authentication element set (P, m, $\sigma_c$) publicized in the blockchain.

The distribution terminal 6 according to the embodiment does not request the user public key $P_u$ for anonymity to the browsing terminal 5. Information that can be known by the distribution terminal 6 is only the authentication element set (P, m, $\sigma_c$) and the user signature $\sigma_u$. The distribution terminal 6 may not acquire the user public key $P_u$ for anonymity of the browser from the data. Accordingly, in the embodiment, the browsing terminal 5 can acquire the content by avoiding the distribution terminal 6 relaying and distributing the content from knowing the user public key $P_u$ for anonymity to.

For example, a general-purpose computer system illustrated in FIG. 11 can be used for the permission terminal 4, the browsing terminal 5, and the distribution terminal 6 described above. The computer system illustrated in FIG. 11 includes a central processing unit (CPU) 901, a memory 902, a storage 903 (a hard disk drive (HDD) or a solid state drive (SSD)), a communication device 904, an input device 905, and an output device 906. The memory 902 and the storage 903 are storage devices. In the computer system, each function of each device is realized by causing the CPU 901 to execute a predetermined program loaded on the memory 902.

The permission terminal 4, the browsing terminal 5, and the distribution terminal 6 may be implemented on a single computer or may be implemented on a plurality of computers. The permission terminal 4, the browsing terminal 5, and the distribution terminal 6 may be virtual machines implemented on a computer.

A program for the permission terminal 4, a program for the browsing terminal 5, and a program for the distribution terminal 6 can be stored on a computer-readable recording medium such as an HDD, an SSD, a universal serial bus (USB) memory, a compact disc (CD), or a digital versatile disc (DVD) or can also be delivered via a network.

The present invention is not limited to the foregoing embodiments and various modifications can be made within the scope of the gist of the present invention. For example, the following modification examples can be made.

Modification Example 1

In key aggregation in which a BLS signature is used, in order to prevent an unauthorized key exchange attack such as a rouge-key attack, a countermeasure to multiply a signature value or a key by a specific number and perform aggregation is taken in some cases. By performing a similar countermeasure in the embodiment, it is possible to maintain anonymity more strongly.

In this modification example, two private values $t_c$ and $t_u$ determined deterministically between a permitter and a browser are prepared. For example, a hash function $H_0$ outputting each unique numerical value from the addition cyclic group $G_1$ may be applied to the content public key $P_c$ for anonymity and the user public key $P_u$ for anonymity to set $t_c$ and $t_u$. Here, the aggregate public key is defined as follows.

$$P' \leftarrow t_c P_c + t_u P_u \qquad \text{[Math. 14]}$$

In this case, a corresponding aggregate signature is as follows.

$$\sigma' \leftarrow t_c \sigma_c + t_u \sigma_u \qquad \text{[Math. 15]}$$

In the signature verification, whether $e(H(m), P') = e(\sigma', Q)$ is established is verified. If $e(H(m), P') = e(\sigma', Q)$ is established, it is confirmed that a signature is an authorized signature. In this case, the content signature $\sigma_c$ described in the foregoing embodiments is multiplied by $t_c$ and is substituted with a content signature $t_c \sigma_c$. Accordingly, an authentication element set included in the access information is (P', m, $t_c \sigma_c$). Information regarding a browser attached by the browsing terminal 5 in a content request is multiplied by $t_u$ to obtain $t_u \sigma_u$.

Modification Example 2

In the foregoing embodiments, when the content is requested, the browsing terminal 5 attaches the user signature $\sigma_u$ for anonymity of the browser. However, the aggregate signature $\sigma = \sigma_c + \sigma_u$ may be calculated on the side of the browsing terminal 5 and the aggregate signature $\sigma$ may be attached. That is, the checking unit 523 of the browsing terminal 5 may transmit a content request including the aggregate signature $\sigma$ instead of the user signature $\sigma_u$ for anonymity. In this case, the sharing control unit 425 of the permission terminal 4 verifies the aggregate signature included in the content request with the aggregate public key of the authentication element set (the access information) and determines whether the content request is permitted.

Specifically, in S26 of FIG. 6, "when the verification of the aggregate signature succeeds, the user signature (au of the browser is output". However, the "user signature $\sigma_u$" may be substituted with "the aggregate signature $\sigma=\sigma_c+\sigma_u$" which has already been aggregated. In this case, the content request transmitted in S27 and S28 includes the aggregate signature σ instead of the user signature $\sigma_u$. The permission terminal 4 verifies the aggregate signature included in the content request with the aggregate public key P. Accordingly, it is not necessary to compute the signature aggregation of S31 and the permission terminal 4 can reduce a computation load.

The same applies to the second embodiment. That is, the browsing terminal 5 and the distribution terminal 6 according to the second embodiment may transmit a content request that includes the aggregate signature σ instead of the user signatures $\sigma_u$ and $\sigma_d$ for anonymity (S56 to S58 and S73 to S75 in FIGS. 9 and 10). In this case, the permission terminal 4 and the distribution terminal 6 according to the second embodiment verify the aggregate signature σ included in the content request with the aggregate public key of the authentication element set and determine whether to permit the content request (S60 and S77 in FIG. 10).

REFERENCE SIGNS LIST 1, 1A Content use system
2 Blockchain system
3 File management system
4 Permission terminal
421 Blockchain control unit
422 File management unit
423 Generation unit
424 Registration unit
425 Sharing control unit
5 Browsing terminal
521 Blockchain control unit
522 Key management unit
523 Checking unit
524 Request unit
525 Synchronization unit
6 Distribution terminal
621 Blockchain control unit
622 Key management unit
623 Checking unit
624 Request unit
625 Synchronization unit
626 Sharing control unit
411, 511, 611 Blockchain
412, 512, 612 Content data
413, 513, 613 Key management data
414, 514, 614 Program

The invention claimed is:

1. A content use system comprising:
a permission terminal; and
a browsing terminal, wherein
the permission terminal includes one or more processors configured to:
generate access information for content using a content public key of the content and a user public key of a browser of the content, and
register the access information in a blockchain, wherein the access information includes an aggregate public key that is generated based on aggregating the content public key and the user public key, a message for the content, and a content signature obtained by signing the message with a content private key corresponding to the content public key, wherein
the browsing terminal includes one or more processors configured to:
acquire the access information of content from the blockchain,
generate an aggregate signature based on aggregating (i) the content signature, and (ii) a user signature obtained by signing the message with a user private key corresponding to the user public key, and
verify whether a particular user is authorized to access the content based on the aggregate public key included in the access information, and the aggregate signature obtained based on the user private key of the particular user, and
transmit a content request including the user signature or the aggregate signature in response to determining that the verification succeeds.

2. A permission terminal comprising one or more processors configured to:
generate access information for content using a content public key of the content and a user public key of a browser of the content; and
register the access information in a blockchain, wherein the access information includes an aggregate public key that is generated based on aggregating the content public key and the user public key, a message for the content, and a content signature obtained by signing the message with a content private key corresponding to the content public key.

3. The permission terminal according to claim 2, wherein the one or more processors are configured to:
acquire the access information corresponding to the content from the blockchain in response to a content request,
generate an aggregate signature based on aggregating (i) the content signature included in the access information, and (ii) a user signature included in the content request and obtained by signing the message with a user private key corresponding to the user public key,
verify whether a particular user is authorized to access the content based on the aggregate public key included in the access information and the aggregate signature obtained based on the user private key of the particular user, and
determine whether to permit the content request of the particular user.

4. The permission terminal according to claim 2, wherein the one or more processors are configured to:
acquire the access information corresponding to the content from the blockchain in response to a content request,
verify whether a particular user is authorized to access the content based on the aggregate public key included in the access information and an aggregate signature included in the content request of the particular user, and
determine whether to permit the content request.

5. A browsing terminal comprising one or more processors configured to:
acquire access information of requested content from a blockchain, wherein the access information includes an aggregate public key that is generated based on aggregating a content public key and a user public key, a message for the content, and a content signature obtained by signing the message with a content private key corresponding to the content public key;

generate an aggregate signature based on aggregating (i)) the content signature included in the access information, and (ii) a user signature obtained by signing the message with a user private key corresponding to the user public key;

verify whether a particular user is authorized to access the content based on (i) the aggregate public key included in the access information, and (ii) the aggregate signature; and transmit a content request including the user signature or the aggregate signature in response to determining that the verification succeeds.

* * * * *